US012318742B2

(12) United States Patent
McConville et al.

(10) Patent No.: US 12,318,742 B2
(45) Date of Patent: Jun. 3, 2025

(54) DEVICES, SYSTEMS AND METHODS FOR MIXING AND/OR INTRODUCING AGROCHEMICALS

(71) Applicant: DRASLOVKA SERVICES PTY LTD, Melbourne (AU)

(72) Inventors: Kade McConville, North Melbourne (AU); Adam Trocha, Tullamarine (AU)

(73) Assignee: DRASLOVKA SERVICES PTY LTD, Melbourne (AU)

( * ) Notice: Subject to any disclaimer, the term of this patent is extended or adjusted under 35 U.S.C. 154(b) by 718 days.

(21) Appl. No.: 17/541,762

(22) Filed: Dec. 3, 2021

(65) Prior Publication Data

US 2022/0088552 A1 Mar. 24, 2022

Related U.S. Application Data

(63) Continuation of application No. PCT/AU2020/050567, filed on Jun. 4, 2020.

(30) Foreign Application Priority Data

Jun. 7, 2019 (AU) ................................ 2019204014
Jun. 7, 2019 (AU) ................................ 2019204030

(51) Int. Cl.
*B01F 25/314* (2022.01)
*A01M 13/00* (2006.01)
(Continued)

(52) U.S. Cl.
CPC ....... *B01F 25/31424* (2022.01); *A01M 13/00* (2013.01); *B01F 23/232* (2022.01); *B01F 25/43141* (2022.01); *B01F 2101/04* (2022.01)

(58) Field of Classification Search
CPC .. B01F 25/20; B01F 25/314; B01F 25/31424; B01F 23/232; B01F 2101/04; A01M 13/00
See application file for complete search history.

(56) References Cited

U.S. PATENT DOCUMENTS 3,928,199 A * 12/1975 Kirk et al. ................ C02F 3/26
210/150
4,949,656 A 8/1990 Lyle et al.
(Continued)

FOREIGN PATENT DOCUMENTS

CA 1289015 C * 9/1991 ........... A01C 23/028
DE 10 2011 116 504 A1 4/2013
WO 2013/056793 A1 10/2012

OTHER PUBLICATIONS

Extended European Search Report with written opinion issued by the European Patent Office for European Patent Application No. 20818939.9, dated Jun. 5, 2023.
(Continued)

*Primary Examiner* — Tara Mayo
(74) *Attorney, Agent, or Firm* — Myers Wolin, LLC

(57) ABSTRACT

Devices, systems and methods for mixing and/or introducing agrochemicals, comprising a mixer including a mixing chamber in which a liquid is able to flow, and a delivery point located on the mixing chamber for delivering an agrochemical into the mixing chamber, wherein the mixer includes means for generating backpressure in the liquid and the agrochemical in the mixing chamber, and a mixer system including a mixer, an injector, and an agrochemical source, wherein the injector is adapted to receive an agrochemical from the agrochemical source, and a method including the steps of supplying a liquid into a mixing chamber of a mixer or mixer system, delivering an agrochemical into the mixing chamber, and generating backpressure to the liquid flowing through the mixing chamber to effect mixing of the liquid and the delivered agrochemical.

15 Claims, 7 Drawing Sheets

(51) Int. Cl.

| | |
|---|---|
| ***B01F 23/232*** | (2022.01) |
| ***B01F 25/4314*** | (2022.01) |
| ***B01F 101/04*** | (2022.01) |

(56) References Cited

U.S. PATENT DOCUMENTS

| | | | | |
|---|---|---|---|---|
| 7,040,839 | B1 | 5/2006 | Mazzei | |
| 8,267,381 | B2 | 9/2012 | Schneider | |
| 2005/0076818 | A1 * | 4/2005 | Grimm et al. ....... | A01C 23/024 111/119 |
| 2006/0073080 | A1 | 4/2006 | Tonkovich et al. | |
| 2014/0339143 | A1 | 10/2014 | Kerfoot | |
| 2015/0305321 | A1 | 10/2015 | Weis | |

OTHER PUBLICATIONS

Intemational Search Report corresponding to International Patent Application No. PCT/AU2020/050567 mailed on Aug. 24, 2020.

Written Opinion of the International Searching Authority issued for corresponding to International Patent Application No. PCT/AU2020/050567 mailed on Aug. 24, 2020.

Written Opinion of the Intemational Preliminary Examining Authority issued for corresponding to International Patent Application No. PCT/AU2020/050567 mailed on Jun. 7, 2021.

International Preliminary Report on Patentability issued for corresponding to International Patent Application No. PCT/AU2020/050567 mailed on Sep. 22, 2021.

* cited by examiner

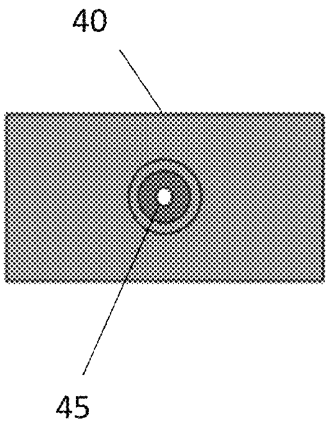
FIG 2A
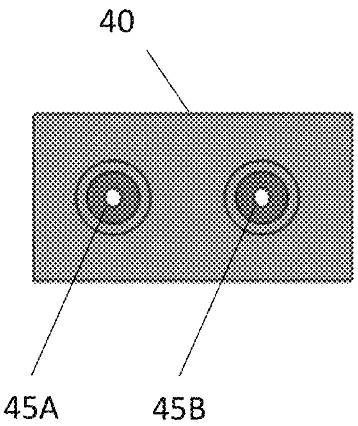
FIG 2B
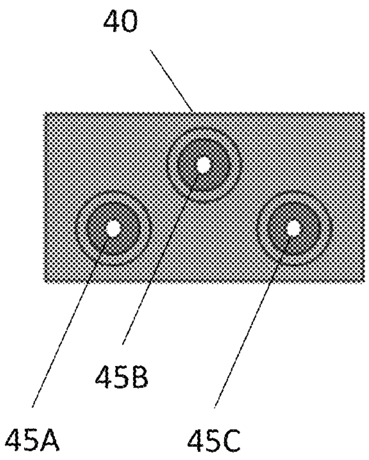
FIG 2C
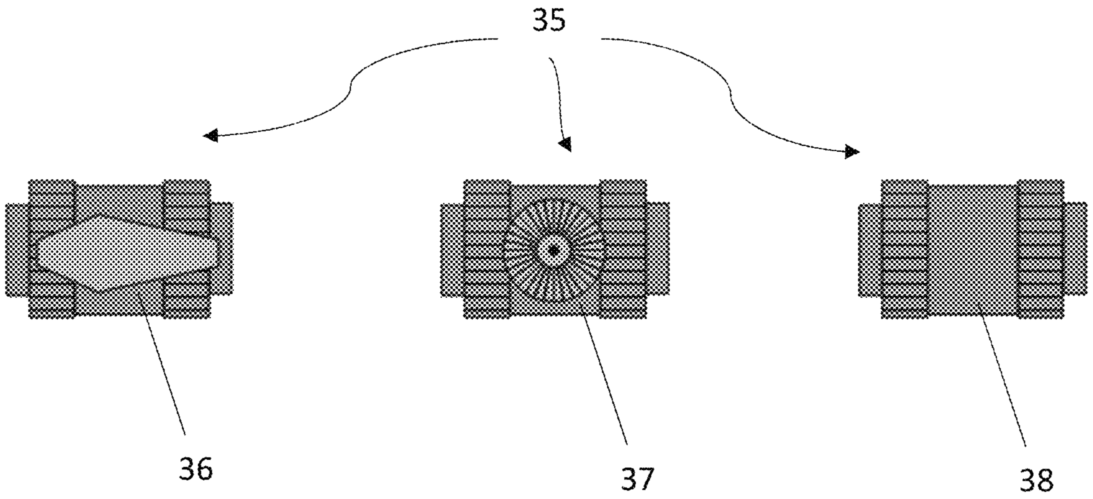
FIG 3A
FIG 3B
FIG 3C

DEVICES, SYSTEMS AND METHODS FOR MIXING AND/OR INTRODUCING AGROCHEMICALS

CROSS REFERENCE TO RELATED APPLICATIONS

This application is a continuation under 35 U.S.C. § 111 from International Patent Application Serial No. PCT/AU2020/050567, filed on Jun. 4, 2020, which claims priority to both Australian Application 2019204014, filed on Jun. 7, 2019, and Australian Application 2019204030, filed on Jun. 7, 2019, the contents of each of which are incorporated by reference in their entirety for all purposes.

TECHNICAL FIELD

The invention relates to devices and systems for mixing an agrochemical with, and/or introducing an agrochemical into, a liquid, and related systems and methods. In particular, the invention relates to, inter alia, a mixer, an injector, a mixer that incorporates said injector, a mixing system, an injecting system, and related methods and systems for mixing an agrochemical and a liquid, or for introducing an agrochemical into a liquid. The invention more particularly relates to mixing or introducing a gaseous and/or liquid agrochemical, and most particularly relates to applications where a fumigant agrochemical, cyanogen (C2N2), is injected into and/or mixed with liquid water (H2O).

RELATED ART

The contents of Australian patent application no. 2019204014 entitled "AN INJECTOR AND INJECTOR SYSTEM FOR INTRODUCING AN AGROCHEMICAL INTO A LIQUID" filed on 7 Jun. 2019, and the contents of Australian patent application no. 2019204030 entitled "A MIXER AND MIXING SYSTEM FOR MIXING AN AGROCHEMICAL WITH A LIQUID, AND RELATED SYSTEMS AND METHODS" also filed on 7 Jun. 2019, are each hereby incorporated into this application in their entirety. Priority to both abovementioned Australian patent applications is claimed.

BACKGROUND ART

Fumigants, or gaseous pesticides, are traditionally used to suffocate or poison pests within an area. Mixing of fumigants with liquid is therefore less common in the prior art, as the fumigant is usually applied in its gaseous state to occupy a sealed area. Where an agrochemical (e.g. pesticide) is in liquid form and it is desired to mix that liquid form agrochemical with a separate liquid, this is commonly done in a simple fashion by adding the liquid agrochemical and other liquid together (e.g. pouring the agrochemical liquid into a repository or conduit containing the other liquid). Furthermore, such mixing of liquid agrochemicals and other liquids is generally done in an agricultural context where access to more sophisticated mixing mechanisms is limited. Some mixing arrangements are referred to as chemigation, which can be understood as the delivery of a chemical into a pipeline carrying water so that the chemical water mixture can be distributed to the land using an irrigation system.

However, some gaseous pesticides are highly effective when mixed with a liquid (i.e. a gas pesticide infused liquid). In particular, cyanogen, a relatively recently developed gaseous pesticide, is particularly efficacious in the context of soil disinfestation where it is able to penetrate into the soil in the form of a gas pesticide infused liquid.

Cyanogen (or Ethanedinitrile) is an alternative to other fumigants like Methyl Bromide, which have been used in the past for soil fumigation but have a number of disadvantages. Cyanogen is an environmentally safe fumigant for the control of pathogens, weeds and insects in soil, as well as controlling timber pests in logs and timber etc. Cyanogen, however, is unique in that it has a boiling point of approximately −21° C. The difference in boiling points between cyanogen and water, for instance, means that mixing with water is a different process for cyanogen compared to existing conventional mixing technologies seen in the market. This results from the cyanogen generally being somewhere between a gas and liquid phase during the mixing process.

Further, it is understood that when Cyanogen is exposed to water, it decomposes to hydrogen cyanide (HCN). There is also some endogenous presence of HCN in commercially available cyanogen which results from the manufacturing process such that this fumigant may include approximately 1% HCN. Since HCN has the capacity to polymerise when exposed to water and under certain physical conditions such as high temperate or pressure environments. Such polymerisation can lead to blockages in flow paths of apparatus used for mixing cyanogen and water. Polymerisation of other agrochemicals may also be problematic.

Further, it is common for mixtures of fumigants or other agrochemicals with flowing liquids (i.e. water) to include emulsifiers to assist with the mixing. One reason for this is because mixing an agrochemical with flowing liquids can, in the absence of emulsifiers or other means, require excessive use of water as the optimum mixing ratios can be very low to achieve the desired mixing. However, adding emulsifiers can increase the cost of the mixture, for example due to the costs of the emulsifier itself as a separate component or due to the costs associated with administering the emulsifier in the mixture.

Where agrochemicals are used in an agricultural setting, it is also advantageous to rely on an existing irrigation system to distribute the agrochemical.

Given the traditional methods of mixing liquid pesticides with other liquids may be cumbersome due to the requirement for large mixing chambers in the context of a sizable (e.g. farming) operation, and/or problematic due to the need to manage mixing of large volumes of material, noting that particular problems such as polymerisation may impact the successful mixing of some agrochemicals, and noting the benefits that flow from minimising the use of emulsifiers, and further noting that pesticides may be more readily transported in a gaseous form, there is a need for an improved injector for introducing an agrochemical (particularly a fumigant) into a liquid and/or a mixer for improved mixing of a fumigant or other agrochemical and a liquid. This need may be particularly present in an agricultural context where the liquid is to be used for irrigation. Also, there may be advantages in providing an injector and/or a mixer able to effectively introduce gaseous agrochemicals (such as Cyanogen) with liquid (such as water) to create a gas pesticide infused liquid, as such mixtures can be more efficacious in delivering a pesticide into soil. Furthermore, there is a particular need for the management of cyanogen when exposed to water to limit the polymerisation of the decomposed HCN in certain environments.

SUMMARY OF INVENTION

The present invention, particularly in relation to a mixer or mixing system or related methods and systems, arises from a recognition that improvements in the mixing of an agrochemical and a liquid can be achieved by providing:

A mixing chamber in the mixer where the agrochemical is introduced to the liquid;

a flow restriction means in or near the mixing chamber such that as liquid flows rapidly into the mixing chamber, the flow restriction means (which may be adjustable, according to the flow rate of the existing irrigation system or other mixing preferences) provides backpressure in the mixing chamber to increase turbulence in the mixture and the rate of mixing of the fumigant or other agrochemical and the liquid; and/or one or more static mixing sections within the mixer to enable homogenising of the liquid and fumigant/agrochemical mixture; and/or one or more static mixing sections within the mixer to dampen pressure fluctuations; and/or one or more static mixing sections within the mixer to increase the entrainment of the fumigant or other agrochemical in the liquid; and/or pipework in the mixer being appropriately sized (i.e. diameter) to decrease pressure drops as the liquid/mixture travels through the mixer and enhance entrainment of the fumigant or other agrochemical, which in turn decreases the amount of fumigant or other agrochemical which is released from the liquid; and/or pipework in the mixer being appropriately sized to increase the velocity of liquid through the mixer, which creates higher turbulence and therefore more entrainment; and/or pipework in the mixer being appropriately sized to compress the mixture and increase mixing of the fumigant or other agrochemical in the liquid; and/or allowing the user to monitor mixing activity at the local point of agrochemical delivery (c.f. at the pump head), and provide control over agrochemical delivery; and permitting remote monitoring and/or control; and/or providing built-in indicators in the mixer, such as pressure indicators and a real-time liquid flow meter allow for accurate dosing of the fumigants and/or agrochemicals in relation to the liquid flow rate and pressure; and/or a horizontal arrangement of smaller diameter pipework in the mixer (as opposed to larger diameter vertical pipework) to increase the velocity of liquid flow, which in turn reduces the tendency for a fumigant to make its way to the top headspace of the pipework as the mixture is moving quickly through the system; and/or a mixer having a compact design which, depending on the scale of the application, can be easily transported in a case; and/or having liquid connections external to the case to manage or minimise the impact of leaking on the operation of mixer.

Other improvements derive from recognising that it is not necessary to include a laminar flow section within a mixer, as where a laminar flow section is desirable somewhere within an irrigation system, it may be provided in the undisturbed pipework of the irrigation system to which the mixer is connected. This recognition permits increased mixing and/or turbulence in a mixer of a given size as components enhancing mixing/turbulence are preferred over laminar flow sections, to achieve the goal of maximising turbulence within the mixer.

The present invention, particularly in relation to an injector or injector system, arises from a recognition that improvements in an injector for introducing an agrochemical into a liquid can be achieved by:

improving the process of introducing the agrochemical into the liquid; and/or controlling the flow of the agrochemical through the injector; and/or permitting easy inspection of parts of the injector to manage blockages or other disruptions to flow of flow control within the injector.

The present invention, particularly in relation to an injector system, further arises from a recognition that improvements in an injector system for introducing an agrochemical into a liquid can be achieved by use of an improved injector as described herein in a system which permits flexibility as to the number of injectors and/or the number of agrochemical sources from which the agrochemical is released.

Technical Problem

A technical problem resides in creating a device, system or method which desirably has of one or more of the followings advantages, or at least provides a useful alternative to the prior art by:

a) creating a well homogenised fumigant or other agrochemical and liquid mixture; and/or
b) encouraging turbulence within the device or system; and/or
c) encouraging entrainment of the fumigant infused, or other agrochemical mixed, into the liquid; and/or
d) providing a device, system or method of mixing that offers advantages for monitoring of, or control over agrochemical delivery; and/or
e) providing a compact solution which in some instances is easily transported; and/or
f) mixing of an agrochemical with a liquid so that more agrochemical can be introduced into the liquid flowing through a mixing chamber; and/or
g) providing for inspection in the mixing and/or injector device for sources of blockages or other disruption to agrochemical flow through the device or system; and/or
h) offering flexibility in system set-up to permit improved mixing and/or more consistent or reliable flow of agrochemical into the liquid.

Solution to Problem

According to one aspect of the invention, there is provided a mixer for mixing an agrochemical and a liquid, wherein the mixer includes the following: a mixing chamber for receiving the liquid; a delivery point located on the mixing chamber for delivering the agrochemical into the mixing chamber; wherein the mixer includes means for generating backpressure in the liquid.

The delivery point may be for injecting a fumigant.

The delivery point may be for injecting a gas and/or liquid-agrochemical.

The delivery point may be for injecting the fumigant, gas and/or liquid agrochemical under pressure into the mixing chamber.

The agrochemical may be in a gas and/or liquid state and the delivery point may be for injecting the agrochemical under pressure into the mixing chamber. In one preferred form of the invention, the agrochemical may be in a two-phase a gas-liquid state.

The means for generating backpressure is preferably adapted to generate backpressure in the liquid mixed with the agrochemical in the mixing chamber.

Preferably, the means for generating backpressure is adapted to generate backpressure to the liquid-agrochemical mixture as it flows through the mixing chamber.

The backpressure generating means is preferably adapted to generate turbulence in the liquid-agrochemical mixture in the mixing chamber.

The backpressure generating means may include a flow restriction means at or near an outlet of the mixing chamber for restricting outflow of the liquid-agrochemical mixture from the mixing chamber.

Preferably, in use, the flow restriction means generates backpressure in the liquid-agrochemical mixture in the chamber downstream of a mixing chamber inlet and upstream of a mixing chamber outlet.

The flow restriction means may include one or more of a removable plate;

a non-removable plate; and/or a valve.

The flow restriction means may include a restriction aperture through which the liquid may flow. The restriction aperture may be circular in shape.

The mixing chamber may have an internal cross-sectional diameter which is greater than the internal cross-sectional diameter of the restriction aperture.

The restriction aperture may be adjustable in size.

The restriction aperture may be a low flow aperture able to be adjusted to permit liquid flow at rates between 10 and 100 L/min; the adjustable low flow aperture may be adjustable to permit the liquid to flow at different rates in increments of 10 L/min.

The restriction aperture may be a medium flow aperture able to be adjusted to permit liquid flow at rates between 80 and 300 L/min. The adjustable medium flow aperture is preferably adjustable to permit the liquid to flow at different rates in increments of 20 L/min.

The restriction aperture may be a high flow aperture able to be adjusted to permit liquid flow at rates between 250 and 1000 L/min. The adjustable high flow aperture is preferably adjustable to permit the liquid to flow at different rates in increments of 25 or 50 L/min.

The mixing chamber inlet may include an aperture. The mixing chamber inlet aperture preferably has the same internal cross-sectional diameter as, or a smaller internal cross-sectional diameter than, an internal cross-sectional diameter of the mixing chamber.

The restriction aperture may be housed in a removable plate.

Preferably, the mixer may be configured for use with one or more of a plurality of removable plates, each plate having a unique internal cross-sectional diameter for its respective restriction aperture.

The flow restriction means may comprise a conical section. Preferably, the conical section is located within the mixing chamber. It is particularly preferred that the conical section has an internal cross sectional diameter that starts at approximately the same size as the internal cross sectional diameter of the mixing chamber, then narrows towards an outlet of the mixing chamber.

The flow restriction means may include a restriction valve.

The flow restriction means preferably includes an adjustable restriction valve.

The restriction valve may include one or more of the following: a shut-off valve, a needle valve, a globe valve, a butterfly valve, a plug valve, and/or a ball valve.

The restriction valve may be remotely controllable.

Preferably, the internal cross-sectional diameter of the restriction aperture is between about 15% and 66% of the internal cross sectional diameter of the mixing chamber.

The flow restriction means preferably includes an adjustable restriction aperture and/or adjustable restriction valve to generate the backpressure in the liquid mixed with the agrochemical in the mixing chamber.

The adjustable restriction aperture and/or adjustable restriction valve is preferably adjustable to provide a predetermined amount of turbulence in the liquid flowing through the mixing chamber.

The adjustable restriction aperture and/or adjustable restriction valve is preferably adjustable to provide a predetermined amount of entrainment of the agrochemical within the liquid flowing through the mixing chamber and/or other sections of the mixer.

The adjustable restriction aperture and/or adjustable restriction valve is preferably adjustable to provide increased turbulence and/or entrainment of the agrochemical within the liquid, while maintaining high liquid flow rates through the mixer.

The amount of entrainment of the agrochemical within the liquid flowing through the mixer may be determined by visual inspection of the liquid as it travels through one or more sections of the mixer.

The amount of turbulence of the agrochemical within the liquid flowing through the mixer may be determined by visual inspection of the liquid as it travels through one or more sections of the mixer.

Preferably, one or more inspection sections of the mixer is made of a transparent or substantially transparent material to permit visual inspection of the liquid as it travels through said one or more inspection sections of the mixer.

Preferably, the mixer includes a delivery means for delivering the agrochemical into the liquid.

The delivery means may comprise an injector for delivering the agrochemical into the liquid. The injector preferably includes the following: an injector input for receiving the agrochemical; a connection means for sealably securing the injector to the mixing chamber at the delivery point; an injector output for introducing the agrochemical into the mixing chamber; and a body through which the fumigant can travel, the body located between the injector input and the injector output; wherein the injector output includes a sintered diffuser for introducing the agrochemical into the liquid within the mixing chamber.

The injector is preferably adapted to disperse or diffuse the agrochemical into the liquid in a sparging process. Alternatively, where liquid-liquid injecting is desired, a volumetric chemical injectors or dosing pumps may be utilised.

Preferably, the injector is adapted to introduce the agrochemical into liquid flowing through the mixing chamber.

Preferably, the injector body includes a check valve.

The body may include a first shut-off valve and the check valve is located downstream of the first shut-off valve. The body may include a second shut-off valve and the check valve may be located upstream of the second shut-off valve.

Preferably, the injector is adapted to permit introduction of the agrochemical into the liquid at a controlled rate.

One or more of the first shut-off valve, the second shut-off valve and/or the controllable injector may be remotely controllable.

The injector body may include a pressure gauge. The pressure gauge may be located between the second shut-off valve and the output.

The injector is preferably locatable at the delivery point.

The mixing chamber may have a plurality of delivery points located on the chamber, each delivery point being able to receive an injector or other means of delivering an agrochemical.

The mixer may include a static mixing section for dispersing or mixing the agrochemical into the liquid. The static mixing section may be downstream of the mixing chamber. The static mixing section may include a series of baffles in a tubular housing section. The baffles may be removably fixed in the tubular housing. The baffles may provide for laminar flow division and/or turbulent flow inertia and/or radial mixing with momentum transfer.

The baffles may include one or more elements having the following configurations (which configurations are sometimes referred to using three-letter combinations):

KMS
KMX
HEV
SMV
SMX
SMXL
SMR
KVM
KHT
SMF
ISG
Komax
STT
STS
STL
STM

The baffle elements are preferably spaced apart such that there exists a clear tubular section between at least one pair of baffle elements.

Preferably, the baffles comprise a series of plates. In some preferred forms, the baffle elements form a substantially continuous chain.

The baffles may comprise substantially helical elements.

Baffle elements may be combined with alternating offsets to maximize mixing efficiency by utilizing the action of momentum reversal and flow division.

Each baffle element may include two semi-circular or semi-elliptical plates which are oriented in a transverse direction to each-other.

The baffle may comprise a chain of pairs of transverse semi-circular or semi-elliptical plates.

The mixer may include a check valve. The check valve may be located upstream of the mixing chamber.

The mixer may include one or more flow meter(s) for measuring the flow rate of the liquid, the agrochemical, and/or the liquid-agrochemical mixture. Preferably, a flow meter is positioned at any location upstream or downstream of the mixing chamber, on the injector and/or on other components connected to the mixer or injector.

In a preferred form, the flow meter is located upstream of the check valve. The flow meter is preferably located near to a mixer inlet. The flow meter is preferably battery powered. The flow meter in a preferred form is a George Fischer Signet 8150 Battery Powered Flow Totaliser.

The flow meter may include a transmitter for long distance transmission of signals received by one or more flow sensors on the flow meter.

The mixer may include one or more pressure gauge(s) located on the mixer (including on the injector), for measuring pressure of the liquid, the liquid-agrochemical mixture and/or the agrochemical. Preferably, one or more pressure gauge(s) are located upstream and/or downstream of the mixing chamber for measuring the pressure of the liquid and/or liquid-agrochemical mixture.

The mixer may include a mixer outlet. The mixer outlet may be located proximate to the mixer inlet.

The mixer may include an inlet pressure gauge located proximate to and downstream of the mixer inlet. The inlet pressure gauge may be located upstream of the check valve.

The mixer may include an outlet pressure gauge located proximate to and upstream of the mixer outlet.

The mixer may include an outlet control valve proximate to the mixer outlet. The outlet control valve preferably includes a shut-off valve. The outlet control valve may be a ball valve.

The outlet control valve may be remotely controllable.

Preferably, the mixer comprises a plurality of modular mixer parts, each mixer part adapted to sealably connect to another mixer part. One or more of the plurality of modular mixer parts may comprise a section of piping. One or more of the plurality of modular mixer parts may have threaded socket fittings. One or more of the plurality of modular mixer parts may be screwably connectable to another mixer part.

Preferably, one or more of each of the following are located on, or comprise, a separate modular mixer part:

a. the mixing chamber;
b. the restriction plate;
c. the restriction valve;
d. the outlet control valve;
e. one or more of the pressure gauge(s);
f. one or more of the flow rate meter(s);
g. the static mixing section;
h. the injector body;
i. the injector check valve;
j. the injector first shut-off valve;
k. the injector second shut-off valve;
l. the injector sintered diffuser;
m. the connector for connecting the injector to the mixing chamber;
n. the injector pressure gauge; and/or
o. a connecting member for connecting two or more of the plurality of modular body parts (e.g. tubular sections).

The agrochemical may include EDN. The agrochemical may include a nitrogen gas component. The agrochemical may comprise a combination of EDN and nitrogen.

In a preferred form, the mixing chamber is an expansion chamber. The expansion chamber preferably allows for the expansion of fumigants or other gaseous agrochemicals under pressure to be delivered into the expansion chamber. Preferably the liquid is under pressure and thus assists in the mixing process.

In a particularly preferred form, the dimensions of parts of a smaller size mixer are as follows:

a. The mixing chamber has an internal cross sectional diameter of about 2 inches or about 5 cm;
b. The flow restriction means comprises a restriction aperture having an internal cross sectional diameter that is adjustable;
c. Connecting members (which may include one or more static mixer sections) have an internal cross sectional diameter of about 1 in or about 2.5 cm.

In a preferred form, the adjustable restriction aperture of the smaller size mixer is a diaphragm valve adjustable up to about 0.5 in or about 1.25 cm. Preferably, the diaphragm valve has the characteristics of the GF Type 515 DN 15 valve. Preferably, the diaphragm valve has two spigot ends into one of which liquid may flow into the diaphragm valve, and from the other of which the liquid may exit the diaphragm valve.

In a further particularly preferred form, the dimensions of parts of a medium size mixer are as follows:

a. The mixing chamber has an internal cross sectional diameter of about 3 inches or about 7.5 cm;
b. The flow restriction means comprises a restriction aperture having an internal cross sectional diameter that is adjustable;
c. Connecting members (which may include one or more static mixer sections) have an internal cross sectional diameter of about 2 in or 5 cm.

In a preferred form, the adjustable restriction aperture of the medium size mixer is an orifice valve adjustable between about 0.5 in (or about 1.25 cm) and about 1.5 in (or about 3.75 cm). Alternatively, the medium size adjustable restriction aperture may be a diaphragm valve adjustable up to about 1 in or about 5 cm. Preferably, the diaphragm valve has the characteristics of the GF Type 515 DN 25 valve. In a further preferred alternative configuration, the adjustable restriction aperture of the medium size mixer is a ball valve adjustable up to about 2 in or about 10 cm. Preferably, the ball valve has the characteristics of the GF Type 546 valve.

In a further particularly preferred form, the dimensions of parts of a larger size mixer are as follows:

a. The mixing chamber has a maximum internal cross sectional diameter of about 11.5 cm, plus or minus about 1.25 to 1.5 cm (or about 4.5 in, plus or minus about 0.5 in to 0.6 in);
b. The flow restriction means comprises a conical orifice having a minimum internal cross sectional diameter of about 40 mm (or about 1.57 in);
c. Connecting members have an internal cross sectional diameter of about 2 in or 5 cm;
d. A static mixer section having an internal cross sectional diameter (i.e. without baffles) of about 3 in or 7.5 cm.

The preferred dimensions of the components of the smaller, medium and large mixer are provided with some specificity above, however, it should be understood by use of the term 'about' in this application in the above description and elsewhere in the specification, that a range of dimensions around the preferred dimensions is permitted.

Preferably, the conical orifice is located within the mixing chamber. It is further preferred that the conical orifice is located towards an outlet of the mixing chamber. Preferably, the maximum internal cross sectional diameter of the conical section restriction aperture is about 11 cm or about 4.3 in (i.e. matching the maximum internal cross sectional diameter of the mixing chamber).

Preferably, the mixer is configured to permit adjustments to be made to the flow restriction means and/or other adjustment means based on the visual inspection of the mixture to enable improved mixing of the liquid and agrochemical. It is particularly preferred to include an adjustable flow restriction means (and/or means to adjust the agrochemical delivery rate) as well as at least one section of clear section of pipework to enable visual inspection of the agrochemical and liquid mixture.

The internal cross-sectional diameter or types of valves and/or fitting of any of the aforementioned parts may vary according to the combinations of mixer parts and overall arrangement of the mixer. In particular, the internal diameter of a mixer part may vary within the part and so the referenced dimensions may be understood as the maximum value within the part.

According to a second aspect of the invention, there is provided a mixer for mixing an agrochemical and a liquid, the mixer including: a mixing chamber through which the liquid is able to flow; a delivery point located on the mixing chamber for delivering an agrochemical into the mixing chamber; wherein the mixer includes means for generating backpressure in the liquid as it flows through the mixing chamber.

According to a third aspect of the invention, there is provided a mixer for mixing an agrochemical and a liquid, wherein the mixer includes the following: a mixing chamber through which the liquid is able to flow; a delivery point located on the mixing chamber for delivering an agrochemical into the mixing chamber; wherein the mixer includes means for generating backpressure in the liquid mixed with the agrochemical in the mixing chamber as the liquid-agrochemical mixture flows through the mixing chamber.

According to a fourth aspect of the invention, there is provided a mixer system for mixing an agrochemical and a liquid, wherein the mixer system includes the following: a mixing chamber through which the liquid is able to flow; a delivery point located on the mixing chamber, wherein the delivery point is for delivering the agrochemical into the mixing chamber; an agrochemical source; a delivery means locatable at a delivery point, the delivery means including a delivery means input for receiving the agrochemical from the agrochemical source; wherein the mixer system includes means for generating backpressure in the liquid.

The delivery means may be an injector, where liquid or gas form agrochemical, but may comprise other delivery means known to the person skilled in the art.

The agrochemical may be a fumigant and the delivery means may be the injector substantially as described in relation to the sixth aspect of the invention below.

The means for generating backpressure may be adapted to generate backpressure in the liquid mixed with the delivered agrochemical in the mixing chamber.

The means for generating backpressure may be adapted to generate backpressure to the liquid-agrochemical mixture as it flows through the mixing chamber.

The backpressure generating means may be adapted to generate turbulence in the liquid-agrochemical mixture in the mixing chamber.

According to a fourth aspect of the invention, there is provided a method of mixing an agrochemical and a liquid including the non-limiting steps of: supplying the liquid into a mixing chamber of a mixer as described above; delivering the agrochemical into the mixing chamber; and generating backpressure to the liquid flowing through the mixing chamber to effect mixing of the liquid and the delivered agrochemical.

The method preferably includes the step of generating turbulence in the liquid-agrochemical mixture flowing through the mixing chamber by the same means with which the backpressure is generated.

Preferably, backpressure is generated by a flow restriction means as described above in relation to the first aspect of the invention.

The method may include the step of adjusting the flow restriction means to provide improved turbulence and/or entrainment of the agrochemical within the liquid.

The method may include the step of adjusting the flow restriction means to provide increased turbulence and/or entrainment of agrochemical within the liquid, while maintaining high liquid flow rates.

The method may include the step of monitoring the liquid flow rate using a liquid flow rate monitor.

The method may include the step of monitoring the agrochemical delivery rate using a delivery rate monitor locally located at the delivery point.

The method may include the step of controlling the agrochemical delivery rate to match the liquid flow rates to provide increased homogenisation of the liquid-agrochemical mixture.

The method may include the step of controlling the agrochemical delivery rate to match the liquid flow rates to obtain a predetermined concentration of agrochemical in the liquid-agrochemical mixture. Preferably, the predetermined concentration is determined based on the appropriate concentration for soil chemigation.

Preferably, where the agrochemical is a fumigant, the predetermined concentration is determined based on the appropriate concentration for soil fumigation.

The method may include the step of monitoring the pressure upstream or downstream of the flow restriction means.

The method preferably includes the step of monitoring the pressure at or near the mixer inlet, the mixer outlet and/or the delivery point using pressure gauges located proximate to the mixer inlet, the mixer outlet and/or the delivery point, respectively.

The method may include the step of adjusting the liquid mixture outflow rate and/or outlet pressure by adjusting an outlet control valve.

The method may include the step of controlling the agrochemical delivery rate and/or adjusting the flow restriction means to provide increased homogenisation of the liquid-agrochemical mixture.

The method may include the step of controlling the agrochemical delivery rate and/or adjusting the restriction to obtain a predetermined concentration of agrochemical in the liquid-agrochemical mixture. Preferably, the predetermined concentration is determined based on the appropriate concentration for soil chemigation.

The method may include one or more of the following steps to provide improved turbulence and/or entrainment of agrochemical within the liquid and/or homogenisation of the liquid-agrochemical mixture and/or obtain a predetermined concentration of agrochemical in the liquid-agrochemical mixture:

adjusting the flow restriction means;

controlling the agrochemical delivery rate; and/or adjusting the liquid outflow rate.

The mixing may be conducted above atmospheric pressure. In a preferred form of the invention, the mixing may be conducted at around 1.5-4.0 bar.

According to a fifth aspect of the invention, there is provided a method of soil chemigation comprising mixing an agrochemical and a liquid including the non-limiting steps of: supplying the liquid into a mixing chamber of a mixer as described above; delivering the agrochemical into the mixing chamber at a delivery point; generating back-pressure to the liquid flowing through the mixing chamber to effect mixing of the liquid and the delivered agrochemical; and transferring the mixed liquid-agrochemical mixture to a distribution system either at or below ground to provide for chemical treatment of soil.

According to a sixth aspect of the invention, there is provided an injector for introducing an agrochemical into a liquid, wherein the injector includes the following: an input for receiving the agrochemical; a connection means for sealably securing the injector to a mixing chamber; an output for introducing the agrochemical into the mixing chamber; and a body through which the agrochemical can travel, the body located between the input and the output; wherein the output includes a sintered diffuser for introducing the agrochemical into the liquid within the mixing chamber.

Preferably, the injector is adapted to disperse or diffuse the agrochemical in the liquid in a sparging process.

The injector may be adapted to introduce the agrochemical into liquid flowing through the mixing chamber.

In operation it is preferred that the sintered diffuser extends sufficiently within the mixing chamber to be substantially submerged in the liquid as it flows through the mixing chamber; and as the liquid flows through the mixing chamber, the agrochemical is dispersed or diffused into the liquid in a sparging process.

Preferably, the sintered diffuser is adapted to produce agrochemical bubbles in the liquid of approximately 0.1 to 50 micrometres (μm) in diameter. In a particularly preferred embodiment, the sintered diffuser is adapted to produce bubbles being approximately . . . μm in diameter. Sintered diffusers adapted to produce bubbles having a diameter smaller than 0.1 μm or larger than 50 μm may alternatively be applied. The bubble diameter is preferably chosen to obtain maximum dispersion at the preferred agrochemical and liquid flow rates.

The injector is preferably adapted to permit introduction of the agrochemical into the liquid at a controlled rate.

The injector is preferably adapted to permit introduction of the agrochemical into the liquid where the liquid is flowing at a controlled rate.

The sintered diffuser may be about ¼ inches to about ⅜ inches in length.

The diffuser if preferably thimble-shaped; alternatively it may be cylindrical, conical, frusto-conical, or take the form of another shape suitable for dispersing or diffusing a gas into a liquid.

The sintered diffuser preferably has a media grading of about 0.1 μm to about 200 μm. In preferred from, the sintered diffuser preferably has a media grading of about 1 μm to about 80 μm. In a particularly preferred embodiment, the sintered diffuser has a media grading of approximately 40 μm.

Preferably, the sintered diffuser is made of stainless steel. In a particularly preferred form, the sintered diffuser is made from SS316 or SS304 stainless steel.

The body may include a check valve. Preferably, the body includes a first shut-off valve and the check valve is located downstream of the first shut-off valve. The first shutoff valve may be a needle valve. Alternatively, the first shut-off valve may be a ball valve, or another shut-off valve as known to the skilled addressee.

Preferably, the body includes a second shut-off valve and the check valve is located upstream of the second shut-off valve. The second shut-off valve may be a ball valve. Alternatively, the second shut-off valve may be a needle valve, or another shut-off valve as known to the skilled addressee.

The check valve is preferably located proximate to the first shut-off valve.

The check valve may be located proximate to the input.

The check valve is preferably able to be isolated from the agrochemical and/or the liquid. The check valve is preferably able to be isolated from the agrochemical and/or the liquid by engaging the first and/or second shut-off valves, respectively.

The body may include a pressure gauge. The pressure gauge is preferably located between the second shut-off valve and the output.

The connection means preferably provides for screwable securing of the injector to the mixing chamber. The connection means may comprise a threaded hex connector. Alternatively, the connection means may comprise another connector known to the skilled addressee.

The connection means preferably provides for removable securing of the injector to the mixing chamber.

The body may comprise a plurality of modular body parts, each body part adapted to sealably connect to another body part. One or more of the plurality of modular body parts may comprise a braided hose. One or more of the plurality of modular body parts may have NPT thread fittings. Other fittings which may be used include an M5 thread with O-ring grooves, 10-32 UNF threads, hose barb, and/or butt weld ends. One or more of the plurality of modular body parts may be screwably connectable to another body part.

Preferably, one or more of each of the following are located on, or comprise, a separate modular body part:

a. the first shut-off valve;
b. the second shut-off valve;
c. the check valve;
d. the pressure gauge;
e. the output;
f. the input; and/or
g. a connecting member for connecting two or more of the plurality of modular body parts.

The connecting member may comprise a braided hose. The connecting member may comprise a multi-port adaptor for connecting two or more braided hoses, or one or more braided hose(s) and one or more other modular body part(s).

Preferably, the length of the body may be adjusted by increasing or decreasing the number of connected modular body parts.

One or more of the plurality of modular body parts are preferably formed of stainless steel.

The agrochemical preferably includes EDN. The agrochemical may include a nitrogen gas component. Alternatively, other gases may be included in the agrochemical and in particular other inert gases such as argon and CO2. Preferably, the agrochemical comprises a combination of EDN and nitrogen, or another inert gas.

Preferably the body is able to receive the agrochemical from a single source. The single source may comprise a cylinder.

The body may receive the agrochemical from a plurality of sources. The plurality of sources may include a plurality of cylinders.

A flow meter may be positioned at any location on the body. The flow meter is preferably locatable downstream of one or more of the cylinders.

According to a seventh aspect of the invention, there is provided an injector system for introducing an agrochemical into a liquid, wherein the injector system includes an agrochemical source, an injector and a mixing chamber, the injector having: an input for receiving the agrochemical from the agrochemical source; a connection means for sealably securing the injector to the mixing chamber; an output for introducing the agrochemical into the mixing chamber; and a body through which the agrochemical can travel, the body located between the input and the output; wherein the output includes a sintered diffuser for introducing the agrochemical into the liquid within the mixing chamber.

The injector system is preferably adapted to disperse or diffuse the agrochemical into the liquid in a sparging process.

The injector system is preferably adapted to introduce the agrochemical into liquid flowing through the mixing chamber.

The injector system is preferably adapted to permit introduction of the agrochemical into the liquid at a controlled rate.

Preferably, the injector system is adapted to permit introduction of the agrochemical into the liquid where the liquid is flowing at a controlled rate.

Preferably, the injector system includes a check valve. The system may include a first shut-off valve and the check valve may be located downstream of the first shut-off valve. The first shutoff valve may be a needle valve.

Preferably, the injector system includes a second shut-off valve and the check valve is located upstream of the second shut-off valve. The second shut-off valve may be a ball valve.

The injector system may include a pressure gauge for measuring pressure of the agrochemical. The pressure gauge is preferably located between the second shut-off valve and the output.

The injector system may include a flow meter to measure agrochemical flow. The flow meter is able to be positioned at any location that is compliant with relevant regulations and ratings governing the use of the agrochemical (e.g. compliant with flammable materials ratings).

The injector system may include one or more of the following:

a. shut-off valve;
b. check valve;
c. pressure gauge;
d. flow meter;
e. injector output;
f. injector input; and/or
g. connecting member for connecting two or more of the above.

The injector system may include a plurality of injectors. Each of the plurality of injectors are preferably sealably securable to a single mixing chamber. Each of the plurality of injectors may alternatively be sealably securable to the same mixing chamber.

Preferably, each of the plurality of injectors are connectable to a single agrochemical source. Alternatively, each of the plurality of injectors are connectable to a plurality of agrochemical sources.

According to an eighth aspect of the invention, there is provided a mixer for mixing an agrochemical and a liquid, wherein the mixer includes the following: a mixing chamber in which the liquid is able to flow; a delivery point located on the mixing chamber for delivering the agrochemical into the mixing chamber; wherein the mixer includes means for generating backpressure in the liquid and the agrochemical in the mixing chamber.

Preferably, the backpressure generating means includes a flow restriction means at or near an outlet of the mixing chamber for restricting outflow of the liquid-agrochemical mixture from the mixing chamber. The flow restriction means is preferably adapted to generate increased pressure in the liquid-agrochemical mixture near the flow restriction means and/or upstream of the mixing chamber outlet.

Preferably, in use the flow restriction means generates backpressure in the liquid-agrochemical mixture flowing in the chamber downstream of a mixing chamber inlet and upstream of the mixing chamber outlet.

The flow restriction means is preferably adapted to generate a pressure in the liquid-agrochemical at or near the flow restriction means that is higher than a pressure of the liquid upstream of the mixing chamber inlet.

The flow restriction means may include a restriction aperture. The restriction aperture may be an adjustable aperture.

The mixer may include an outlet control valve proximate to a mixer outlet. The outlet control valve preferably includes a shut-off valve.

The mixer preferably includes an inlet for ingress of the liquid and an outlet for egress of the liquid-agrochemical mixture. The mixer preferably includes a flow meter located near to the mixer inlet. In a preferred form, the mixer includes a check valve located upstream of the mixing chamber. In a particularly preferred form, the inlet flow meter is located upstream of the check valve.

The mixer preferably includes an inlet pressure gauge located proximate to and downstream of the mixer inlet. The mixer preferably includes an outlet pressure gauge located proximate to and upstream of the mixer outlet.

Preferably, the mixer includes a flow meter located near the mixer outlet.

The flow restriction means preferably includes an adjustable restriction aperture and/or adjustable restriction valve to generate the backpressure in the liquid mixed with the agrochemical in the mixing chamber. The adjustable restriction aperture and/or adjustable restriction valve is preferably adjustable to provide a pre-determined amount of turbulence, or a pre-determined amount of entrainment, within the liquid flowing in the mixing chamber and/or other sections of the mixer. In a preferred form, the adjustable restriction aperture and/or adjustable restriction valve is adjustable to provide increased turbulence and/or entrainment of the agrochemical within the liquid, while maintaining high liquid flow rates in the mixer.

Preferably, the amount of entrainment of agrochemical within the liquid flowing in the mixer, or the amount of turbulence, is able to be determined by visual inspection of the liquid and/or liquid-agrochemical mixture as it travels through one or more sections of the mixer. In a preferred form, the mixer includes at least one section made from a material that is translucent, or transparent, to enable visual inspection of the agrochemical and liquid mixture.

The mixer may include a static mixing section for dispersing or further mixing the agrochemical into the liquid.

The mixer may include an injector locatable at the delivery point for delivering the agrochemical into the liquid.

The injector may include the following: an injector input for receiving the agrochemical; a connection means for sealably securing the injector to the mixing chamber at the delivery point; an injector output for introducing the agrochemical into the mixing chamber; and a body through which the fumigant can travel, the body located between the injector input and the injector output.

The injector output preferably includes a sintered diffuser for introducing the agrochemical into the liquid flowing within the mixing chamber.

In operation the sintered diffuser preferably extends sufficiently within the mixing chamber to be substantially submerged in the liquid as it flows in the mixing chamber. Further, in operation, as the liquid flows in the mixing chamber, the agrochemical is preferably dispersed or diffused into the liquid in a sparging process. The sintered diffuser preferably has a media grading of about 1 μm to about 80 μm in diameter to enable production agrochemical bubbles in the liquid having a diameter of about the same dimension., wherein the injector is adapted to permit introduction of the agrochemical into the liquid at a controlled rate.

Preferably, the injector is adapted to permit introduction of the agrochemical into the liquid where the liquid is flowing at a controlled rate.

The body preferably includes a first shut-off valve. Preferably, the body further includes a second shut-off valve. In a preferred form, the body further includes a check valve. In a particularly preferred form, the check valve is located downstream of the first shut-off valve and upstream of the second shut-off valve.

The introduction of the agrochemical may be controlled by the first shut-off valve. The first shut-off valve is preferably a needle valve The injector body may include a pressure gauge. The pressure gauge is preferably located between the second shut-off valve and the output.

Preferably, any one or more of the mixer parts includes monitoring means for monitoring liquid and/or agrochemical and/or liquid-agrochemical mixture properties by application of one or more sensors on the part. The one or more monitoring means or sensors may include one or more of, or a combination of, the following for monitoring the liquid, agrochemical and/or liquid-agrochemical: a flow meter for measuring the rate of flow (e.g. inflow or outflow rate), a pressure gauge for measuring the pressure, other sensors known to the skilled addressee for mearing properties of liquids or gases; the one or more sensors may also comprise transparent or translucent mixer parts to provide visual inspection of turbulence and/or entrainment properties, in particular in relation to the liquid-agrochemical mixture.

Preferably, one or more of the mixer parts includes controlling means for controlling the liquid and/or agrochemical and/or liquid-agrochemical mixture. The controlling means preferably includes, in a preferred form, a needle valve (e.g. as a first shut-off valve) for controlling the flow of agrochemical through the injector. The controlling means may include a valve near the mixer inlet for controlling the inflow of the liquid into the mixer and/or a valve near the mixer outlet for controlling the outflow of the liquid-agrochemical from the mixer.

Preferably, the liquid, agrochemical and/or mixture controlling means is remotely controllable.

Preferably, one or more of each of the mixer parts are located on, or comprise, a modular mixer part, each modular mixer part adapted to sealably connect to another modular mixer part.

In a ninth aspect of the invention, there is provided a mixer system for mixing an agrochemical and a liquid, the mixer system including the following: the mixer as described herein, including the injector substantially as described herein; an agrochemical source; wherein the injector is adapted to receive the agrochemical from the agrochemical source.

The system preferably includes mean for monitoring and/or controlling liquid flow rate in the system using one or more of the monitoring means and/or one or more of the controlling means.

Preferably, the system is able to control the liquid or mixture flow rate using a monitoring means comprising a liquid flow rate monitor and/or controlling means comprising a controllable flow restriction means.

In a preferred form, the system is able to control the agrochemical delivery rate using a monitoring means comprising a delivery rate monitor locally located at the delivery point and/or controlling means comprising a delivery rate controlling means. Preferably, the delivery rate controlling means comprises a variable area flow meter connected to and located downstream of the agrochemical source.

In a preferred form, the injector is able to receive the agrochemical from one or more agrochemical sources.

In a preferred form, the system includes a plurality of injectors. Preferably, each of the plurality of injectors are connectable to one or more of the one or more agrochemical sources.

Preferably, two or more of the plurality of injectors are securable to a single mixing chamber.

In a tenth aspect of the invention, there is provided a method of mixing an agrochemical and a liquid including the non-limiting steps of: supplying the liquid into a mixing chamber of a mixer or mixer system described herein; delivering the agrochemical into the mixing chamber; generating backpressure to the liquid flowing through the mixing chamber to effect mixing of the liquid and the delivered agrochemical.

Preferably, the method includes the step of adjusting the flow restriction means to provide improved turbulence and/or entrainment of the agrochemical within the liquid.

Preferably, the method includes monitoring the liquid flow rate using a liquid flow rate monitor and/or monitoring the agrochemical delivery rate using a delivery rate monitor locally located at the delivery point.

The method preferably includes the step of controlling the agrochemical delivery rate and/or adjusting the flow restriction means to provide increased homogenisation of the liquid-agrochemical mixture.

Preferably, the method includes one or more of the following steps to provide improved turbulence and/or entrainment of agrochemical within the liquid and/or increased homogenisation of the liquid-agrochemical mixture and/or to obtain a predetermined concentration of agrochemical in the liquid-agrochemical mixture: adjusting the flow restriction means; controlling the agrochemical delivery rate; and/or adjusting the liquid outflow rate.

The method preferably includes monitoring the pressure at or near the mixer inlet, the mixer outlet and/or the delivery point using pressure gauges located proximate to the mixer inlet, the mixer outlet and/or the delivery point, respectively.

The method may include the step of adjusting the liquid mixture outflow rate and/or outlet pressure by adjusting an outlet control valve.

In an eleventh aspect of the invention, there is provided a method of soil chemigation comprising mixing an agrochemical and a liquid including the non-limiting steps of: supplying the liquid into a mixing chamber of a mixer or mixer system as described herein; delivering the agrochemical into the mixing chamber at the delivery point; generating backpressure to the liquid flowing through the mixing chamber to effect mixing of the liquid and the delivered agrochemical; and transferring the mixed liquid-agrochemical mixture to a distribution system either at or below ground to provide for chemical treatment of soil.

The abovementioned preferments in relation to one aspect of the invention (e.g. the mixer or the injector) which are not repeated in respect of another aspect of the present invention (e.g. a mixing system or method of mixing or an injector system) should be taken as applicable to those other aspects of the invention.

The features described in relation to one or more aspects of the invention are to be understood as applicable to other aspects of the invention. More generally, combinations of the steps in the method of the invention and/or the features of mixer of the invention described elsewhere in this specification, including in the claims, are to be understood as falling within the scope of the disclosure of this specification.

Advantageous Effects of Invention

One or more advantages are achieved by the present invention, which will be well appreciated by a skilled person, including:

- The use of a sintered diffuser as an injector output and/or controllability of the location of that output within the mixing chamber to provide a much smaller bubble size into the mixing chamber, and therefore intimate contact of the water with the agrochemical by increasing the amount of surface area contact for a given amount of agrochemical; and/or
- Enabling a high rate of dispersion or diffusion of the agrochemical in the liquid (e.g. water)—and hence efficiently provide a homogenous mixture;
- Providing a system of modular parts, which may be advantageous due to offering:
  - flexibility in the location of one part relative to another. This may assist in the inspection of party by isolation of the part to be inspected;
  - flexibility as to the location of a check valve, and in particular as to the location of a check valve relative to other body parts can decrease blockages by limiting water/agrochemical mixing outside of the mixing chamber, and/or provide for easy inspection of blockages in the injector or injector system;
- There are also many manufacturing and economic advantages. As an example, an injector body of adjustable length permits adaptability for use with mixing chambers of different dimensions, where those dimensions are determined by the water flow parameters of an existing liquid distribution network (e.g. irrigation system) into which the injector is to be integrated but over which the user of the injector has little or no control. In other words, users of the injector may be relieved from carrying a number of differently sized injectors, rather, they may only require one injector and a number of small extender or spacer modular body parts.
- Other advantages are achieved by the present invention, including:
  - Minimal or no moving parts; and/or
  - Low maintenance costs; and/or
  - Reducing the need for emulsified chemicals; and/or
  - Fully dismantlable i.e. spare parts etc; and/or
  - Transportable & Lightweight; and/or
  - Improved mixing; and/or
  - Improved control and/or monitoring of mixing.
- The invention lends itself especially well to use in the form of a system to achieve one or more of the abovementioned advantages and/or permitting flexibility as to the number of injectors and/or the number of agrochemical sources from which the agrochemical is released.

BRIEF DESCRIPTION OF DRAWINGS

FIGS. 2A-2C are schematic drawings of alternative mixing chambers according to a preferred embodiment of the invention.

FIGS. 3A-3C are schematic drawings of alternative restriction valves according to a preferred embodiment of the invention.

DESCRIPTION OF EMBODIMENTS

A mixer, mixer system, injector, injector system and related systems and methods as described and depicted herein in connection with illustrative but non-limiting preferred embodiments.

The structure, principle and operation of the mixer, mixer system, injector, injector system and related systems and methods is described herein, as will be appreciated by those skilled in the art.

Figure 1A:
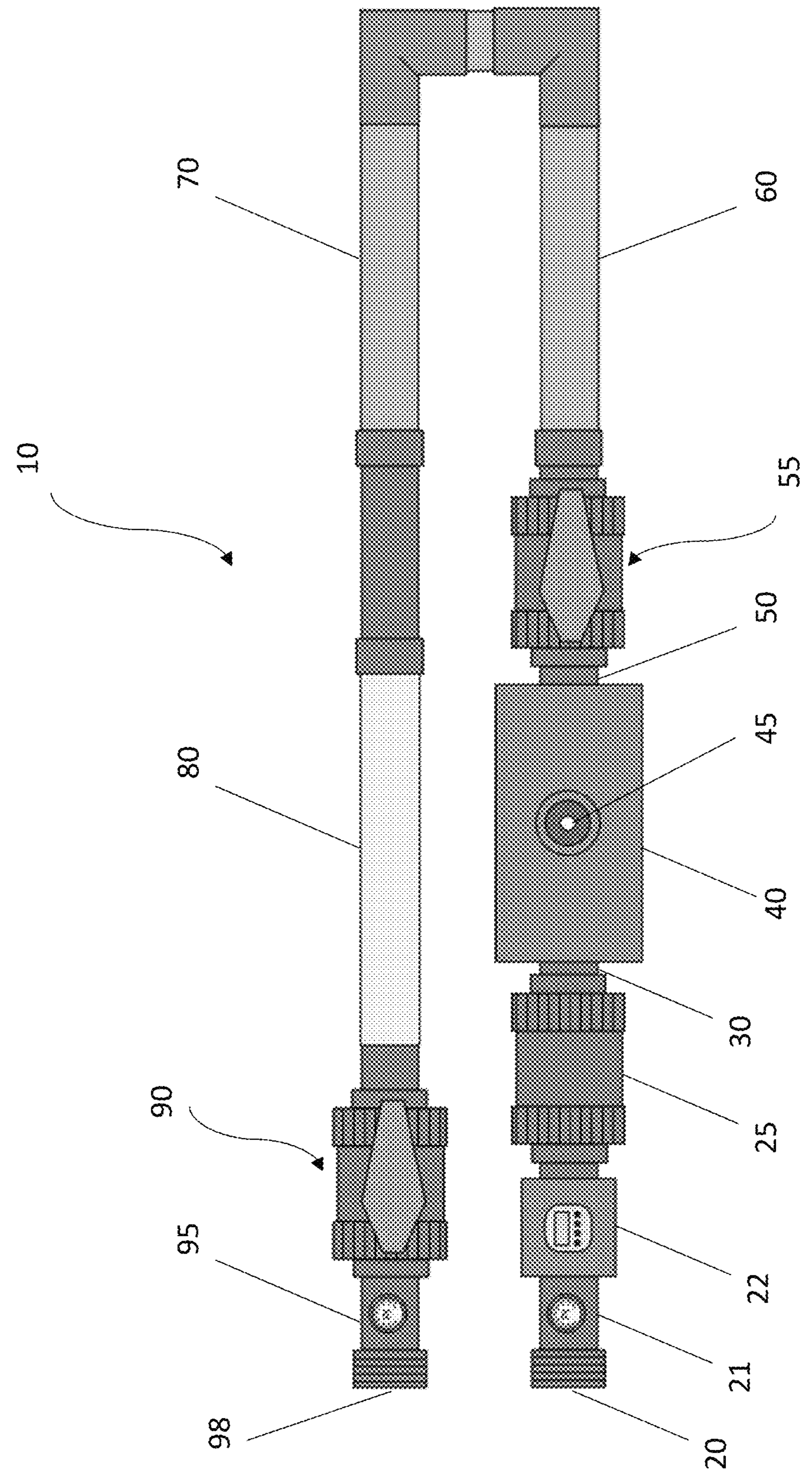
FIG. 1A is a schematic drawing of the mixer according to a preferred embodiment of the present invention.

FIG. 1A depicts a mixer 10 for mixing an agrochemical and a liquid (not shown).

The mixer of FIG. 1A includes a mixing chamber 40, for receiving the liquid via inlet 30. In use, the liquid flows through the mixing chamber 40, by entering the mixing chamber via the inlet 30 and exiting via the outlet 50.

The mixer 10 includes a delivery point 45 located on the mixing chamber 40 for delivering the agrochemical into the mixing chamber 40. As depicted in FIGS. 2A-2C, the mixing chamber may have a one or more injection points 45A-45C.

The delivery point(s) 45 (45A-45C) deliver any one or more of a fumigant, a gas and/or liquid agrochemical into the mixing chamber 40. The delivery points are adapted to deliver the fumigant, gas and/or liquid agrochemical under pressure into the mixing chamber 40.

The mixer 10 includes means for generating backpressure in the liquid. The backpressure generating means includes a flow restriction means 55 at or near an outlet 50 of the mixing chamber for restricting outflow of the liquid-agrochemical mixture from the mixing chamber 40. In the depicted embodiment in FIG. 1, the flow restriction means comprises a valve which is located downstream of the mixing chamber 40. In alternative embodiments of flow restriction means (not depicted) the flow restriction means may be any one or more, or any combination of a removeable plate, a fixed (non-removable) plate and a valve.

The restriction valve 55 includes a restriction aperture (not shown) through which the liquid-agrochemical mixture flows at a higher pressure than the pressure of the liquid upstream of the chamber inlet 30. The restriction aperture is adjustable in size and circular, however, it may be other shapes such as elliptical or octagonal. There may be a plurality of such circular or other shape apertures, the plurality of apertures being either in a single plane (e.g. perpendicular to the direction liquid flow) or in a downstream sequence.

The mixing chamber 40 has an internal cross-sectional diameter which is greater than the internal cross-sectional diameter of the restriction aperture (not shown).

The restriction valve 55 depicted in FIG. 1A is ball valve, which includes a restriction aperture that is adjustable, depending on the desired amount of backpressure and/or turbulence to be generated, and the amount of entrainment of the agrochemical in the liquid flowing through the mixing chamber 40. Alternative valves 35 are depicted in FIGS. 3A-3C, including a ball valve 36, needle valve 37 and a removable pipe section 38 including a restriction aperture.

The mixer includes translucent pipe sections 60, 70, 80 which permit visual inspection of the liquid flowing through them so that the amount of turbulence and/or entrainment of the agrochemical in the liquid is thereby able to be determined.

The mixer 10 includes static mixing sections 60, 70 downstream of the mixing chamber 40. Within each static mixing section 60, 70 is a series of baffles (not shown) in a tubular housing section. The baffles are removably fixed in the tubular housing, and provide for laminar flow division, turbulent flow inertia, radial mixing with momentum transfer. The baffles are configured in accordance with general engineering guidelines for configurations including KMS, KMX, HEV, SMV, SMX SMXL, SMR, KVM, KHT, SMF, ISG, Komax, STT, STS, STL and/or STM.

The mixer 10 includes a check valve 25 to control the direction of the liquid flow, the check valve 25 located upstream of the mixing chamber 40.

The mixer 10 includes a flow meter 22 located upstream of the check valve 25. The flow meter is battery powered. The mixer 10 further includes an inlet pressure gauge 21 located proximate to and downstream of the mixer inlet 20, and upstream of the check valve 25.

The mixer 10 includes a mixer inlet 20 and a mixer outlet 98. In the mixer configuration depicted in FIG. 1A the inlet 20 and outlet 98 are located proximate to one another.

The mixer 10 comprises a plurality of modular mixer parts, each mixer part adapted to sealably connect to another mixer part. Each of the modular mixer parts have threaded socket fittings that are screwably connectable to each other.

The mixer 10 according to the preferred embodiment depicted in FIG. 10 includes the following modular mixer parts:

a. mixing chamber 40;
b. flow restriction valve 55;
c. outlet control valve 90;
d. pressure gauges 21, 95;
e. flow rate meter 21;
f. check valve 25;
g. static mixing sections 60, 70;
h. clear pipe section 80;
i. a connecting member for connecting two or more of the plurality of modular body parts.

The mixer 10 includes an outlet pressure gauge 95 located proximate to and upstream of the mixer outlet 98. The mixer 10 further includes an outlet control valve 90 (a ball valve type shut off valve) proximate to the mixer outlet 98.

Figure 1B:
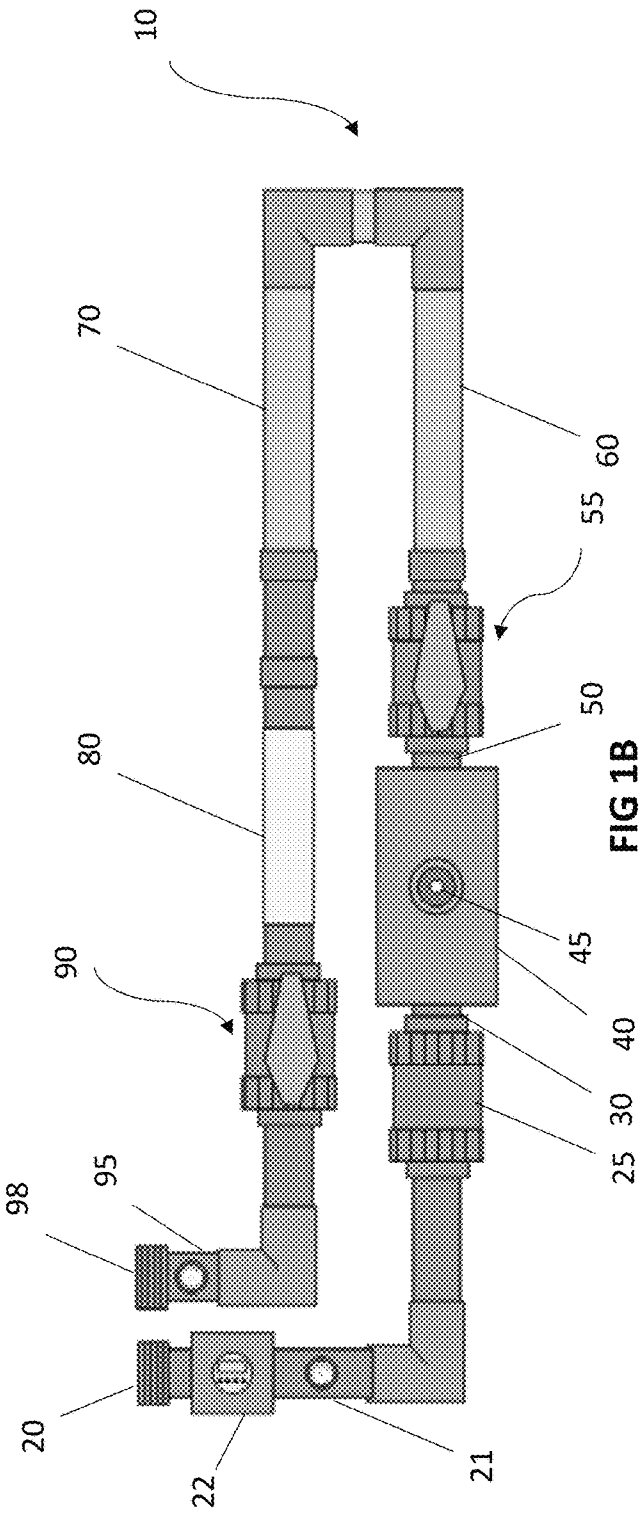
FIG. 1B is a schematic drawing of the mixer according to a preferred embodiment of the present invention.
Figure 1C:
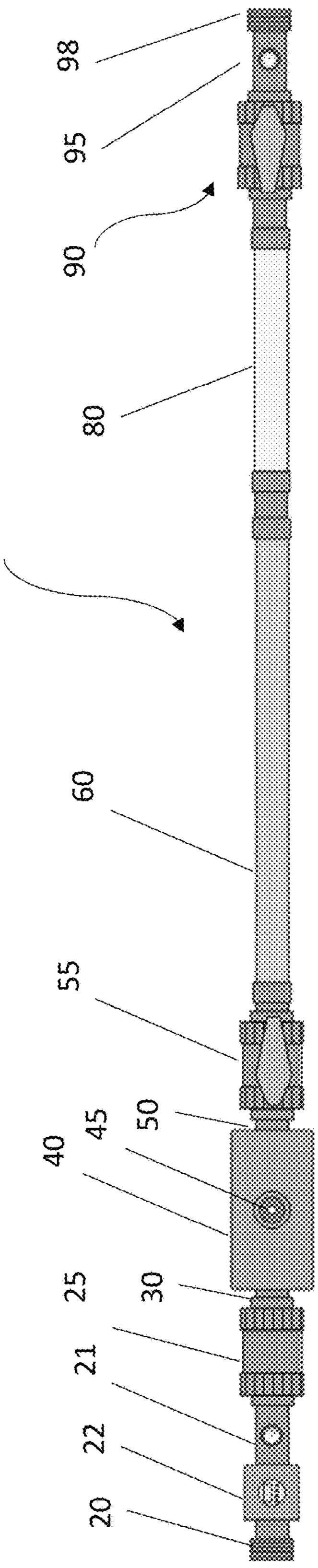
FIG. 1C is a schematic drawing of the mixer according to a preferred embodiment of the present invention.

The mixer may take a variety of configurations, as seen in FIGS. 1B and 1C. In such figures, most of components of the mixer as depicted in FIG. 1A are depicted, including the mixing chamber 40, flow restriction valve 55, static mixer section 60, mixer inlet 20 and mixer outlet 98, outlet control valve 90, and check valve 25. Points of difference which are identified include the mixer inlet 20 and mixer outlet 98 of the straight line configured mixer in FIG. 1C are not located proximate to each other (c.f. the mixers in FIGS. 1A and 1B).

Figure 4A:
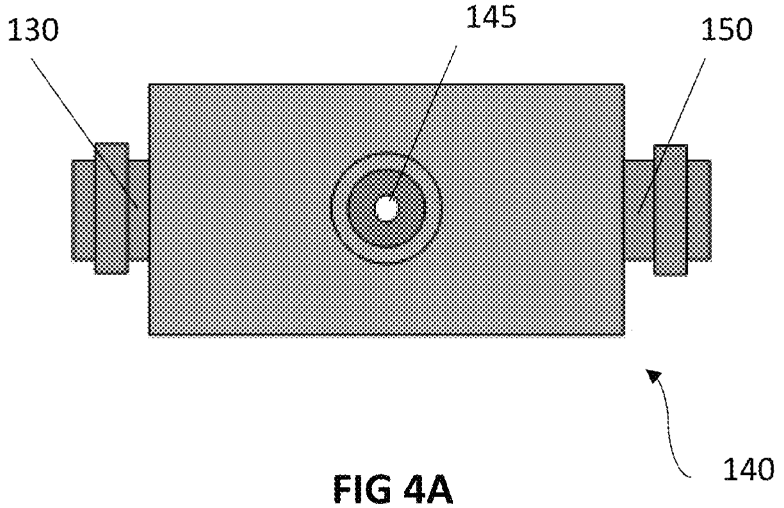
FIG. 4A and FIG. 4B are schematic drawings of a mixing chamber including a conical restriction according to a preferred embodiment of the invention.
Figure 4B:
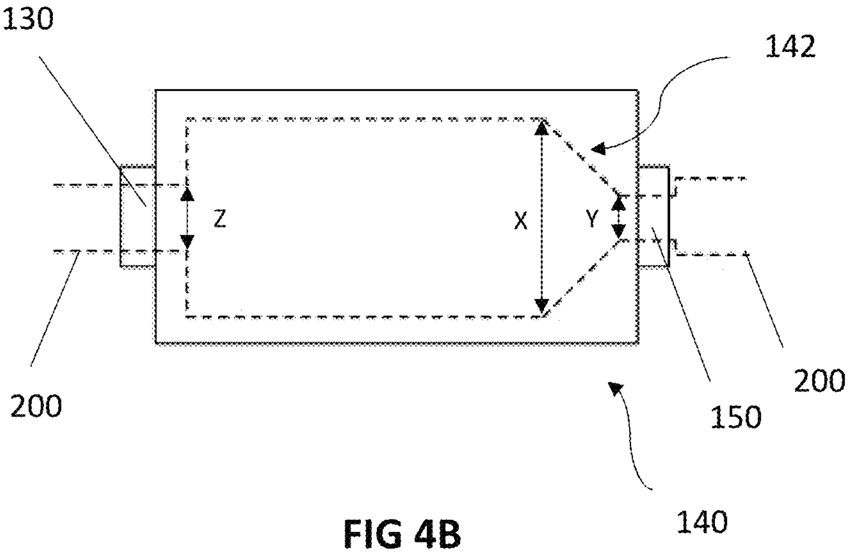

With reference to FIG. 4A, there is shown a mixing chamber 140 having a single delivery point 145, inlet 130 and outlet 150. In FIG. 4B, the internal diameter of the mixing chamber 140 is represented by the dotted lines within the boundary of the chamber 140. The flow restriction means comprises conical section 142 which is located within the body of the mixing chamber 140 and towards the outlet 150 of the mixer. The conical section 142 provides for the generation of backpressure in liquid (not shown) as it flows through the mixing chamber 140. The conical section 142 has a first internal cross sectional diameter that is approximately the same as the maximum internal cross sectional diameter of the mixing chamber (represented by the symbol, X), then narrows toward a second cross sectional diameter (represented by the symbol, Y) near the outlet 150 of the mixing chamber 140. The first cross sectional diameter, X, and the second cross sectional diameter, Y, are 110 mm and 40 mm respectively. It is also noted that the mixing chamber has a third cross sectional diameter, Z, corresponding to that of the inlet 130 which is about 50 mm and greater in diameter than the narrow part of the conical orifice. The third cross sectional dimeter Z is the same as the internal cross sectional diameter of the piping 200 on either side of the mixing chamber 140.

In use, backpressure in the liquid is generated by the mixer 10. In particular, the means for generating backpressure, as described above, is adapted to generate backpressure in the liquid mixed with the agrochemical in the mixing chamber 40. The backpressure generating means is adapted to generate turbulence in the liquid-agrochemical mixture in the mixing chamber. The backpressure generating means is further adapted to generate turbulence in the liquid-agrochemical mixture in the mixing chamber. The agrochemical includes a combination of EDN and a nitrogen gas component.

The flow restriction valve 55 is able to be adjusted to provide improved turbulence and/or entrainment of the agrochemical within the liquid, while maintaining high liquid flow rates.

The liquid flow rate is monitored using the liquid flow rate monitor 22, and the agrochemical delivery rate is also monitored using a delivery rate monitor locally located at the delivery point (not shown). Using the monitors, the agrochemical delivery rate is controlled to match the liquid flow rates to provide increased homogenisation of the liquid-agrochemical mixture and to obtain a predetermined concentration of agrochemical in the liquid-agrochemical mixture (based on the appropriate concentration for soil chemigation).

Additionally, the pressure at or near the mixer inlet 20, the mixer outlet 98 and/or the delivery point 45 is monitored using pressure gauges 21, 95 (others not shown) located proximate to the mixer inlet 90, the mixer outlet 98 and/or the delivery point 45, respectively.

The liquid mixture outflow rate and the outlet pressure is adjustable by adjusting an outlet control valve 90.

The agrochemical delivery rate is controlled and the flow restriction valve 55 is adjusted to provide increased homogenisation of the liquid-agrochemical mixture and to obtain a predetermined concentration of agrochemical in the liquid-agrochemical mixture (based on the appropriate concentration for soil chemigation).

The mixing method is adapted to provide improved turbulence and/or entrainment of agrochemical within the liquid and/or homogenisation of the liquid-agrochemical mixture and obtain a predetermined concentration of agrochemical in the liquid-agrochemical mixture by one or more of each of the following: adjusting the flow restriction means 55; controlling the agrochemical delivery rate; adjusting the liquid outflow rate.

The mixing is conducted above atmospheric pressure.

The invention also provides a soil chemigation method using the mixer 10 for mixing an agrochemical and a liquid, the method includes supplying the liquid into a mixing chamber of a mixer as described above; delivering the agrochemical into the mixing chamber at a delivery point; generating backpressure to the liquid flowing through the mixing chamber to effect mixing of the liquid and the delivered agrochemical; and transferring the mixed liquid-agrochemical mixture to a distribution system either at or below ground to provide for chemical treatment of soil.

Figure 5:
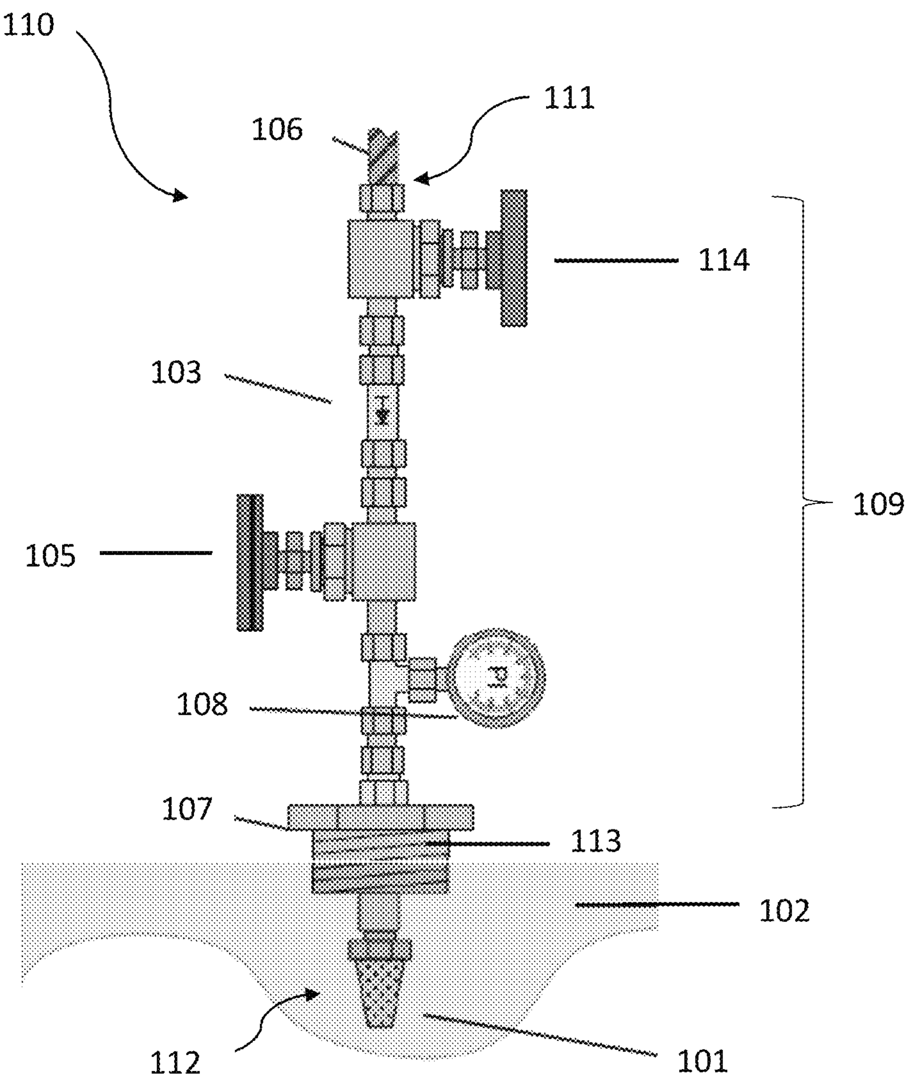
FIG. 5 is a schematic drawing of an injector according to a preferred embodiment of the present invention.
Figure 6:
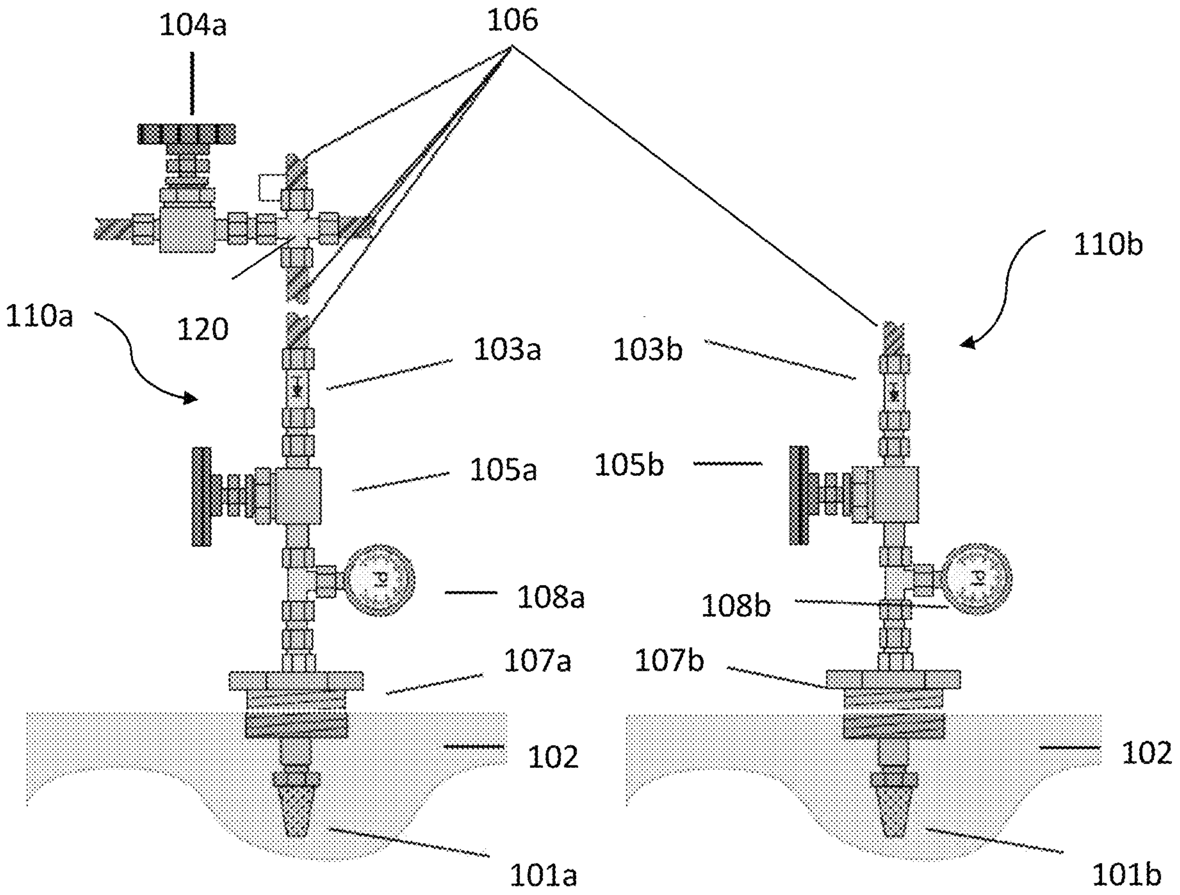
FIG. 6 is a schematic drawing of an injector system including twin injectors according to a preferred embodiment of the present invention.
Figure 7:
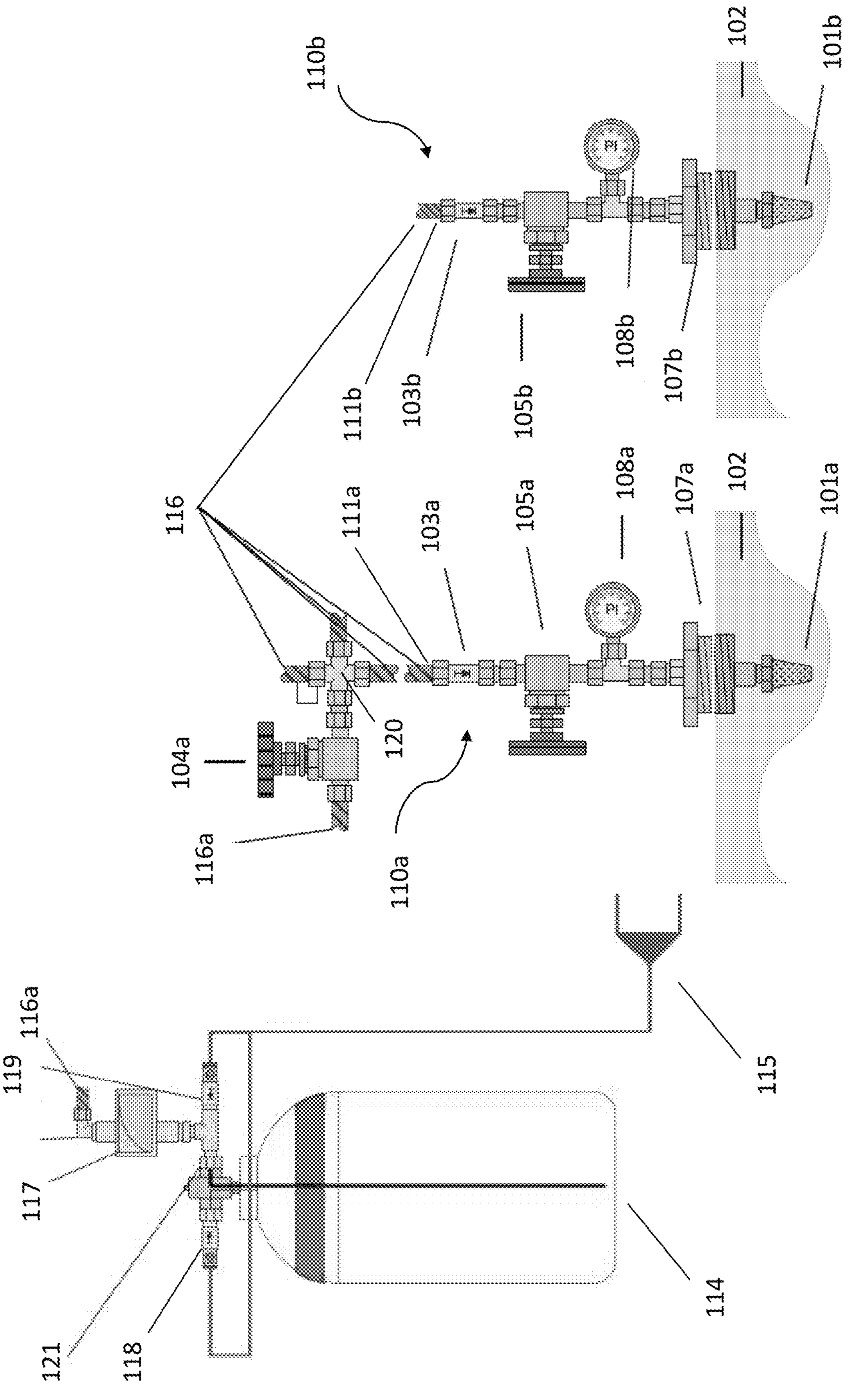
FIG. 7 is a schematic drawing of an injector system including a twin injector set up and one cylinder agrochemical (i.e. fumigant) source, according to a preferred embodiment of the present invention.

FIGS. 5 to 7 depict a single injector, a system of twin injectors, and a system of twin injectors and cylinder fumigant source, respectively, in accordance with a preferred embodiment of the invention.

FIG. 5 depicts a single injector 110 including an input 111 for receiving the fumigant (not shown) and an output 112 for introducing the fumigant into the mixing chamber 102. The body 109 of the injector is located between input 111 and the output 112 and fumigant is able to pass through the body 109. The liquid (also not shown) substantially fills the mixing chamber 102, and the sintered diffuser 101 is thereby submerged in the liquid and the fumigant exits the sintered diffuser 101 within the mixing chamber 102 in a sparging process as the liquid flows through the chamber 102. The mixing chamber 102 of FIG. 5 is sized to permit a large volume of liquid flow (i.e. about 250 litres per minute). Other suitable mixing chambers may permit different flow rates (i.e. about 50 to about 200 litres per minute). The amount of fumigant which exits the sintered diffuser is able to be controlled to ensure an appropriate fumigant to water ratio is attained (generally with the goal of maximising the efficacy of the fumigant infused water). The sintered diffuser is made of stainless steel and has a media grading of approximately 40 μm. The sintered diffuser produces a small fumigant bubble size in the mixing chamber of 40 μm in diameter.

The injector 110 in FIG. 5 further includes check valve 103 for limiting the flow of the fumigant through the body 109 in one direction (i.e. towards the output). This check valve 103 is deliberately located close to the input 111 of the injector 110 in order to limit the likelihood of fumigant/water interaction in or around the check valve which may cause blockages due to polymerisation when the fumigant (cyanogen) mixes with water. The check valve 103 is located downstream of a first shut-off valve 104 (a needle valve) and upstream of a second shut-off valve 105 (a ball valve) so that the check valve 103 can be isolated from the fumigant and/or liquid. Also included in the injector 110 is a threaded hex connector 107 which provides a connection means for sealably securing the injector 110 to the mixing chamber 102 by screwing the connector 107 into the mixing chamber 102 such that the external thread 113 of the hex connector 107 inserts into a complementary internal thread (not shown) of the mixing chamber 102.

Another component included in the injector 110 of FIG. 5 is an optional pressure gauge 108 located proximate to the output 112 for reading the pressure of the fumigant immediately prior to introduction into the mixing chamber 102. A section of braided hose 106 (for connecting to the fumigant source) is also located upstream of the input 111.

FIG. 6 depicts two injectors 110*a* and 110*b*. The two injectors 110*a*, 110*b* each include the majority of the same components as injector 110, namely (respectively) the check valve 103*a*, 103*b*, shut-off valve (ball valve) 105*a*, 105*b*, optional pressure gauge 108*a*, 108*b*, threaded hex connector 107*a*, 107*b* and sintered infuser 101*a*, 101*b* such components being in the same arrangement as the equivalent components of the injector 110. The injectors 110*a*, 110*b* themselves do not include a needle valve. Hex connector 107*a*, 107*b* is sealably secured to the same mixing chamber 102 to which injector 110 is sealably connected, each at a different section of said mixing chamber. FIG. 6 further includes a needle valve 104*a* (separate from the injectors 110*a*, 110*b*) and a connecting member 120 which is a four-way connector having four separate connection points for connection to braided hosing 106 or another connectable element (in the case of FIG. 6, the needle valve 104*a*). The connecting member 120 in FIG. 6 is able to connect multiple injectors to the fumigant source (not shown). In the configuration illustrated in FIG. 6 there are three separate injectors connected to the fumigant source (only two of which injectors are shown, namely injectors 110*a* and 110*b*); each of injectors 110*a* and 110*b* (and the third injector, not shown) are connected to the same mixing chamber 102 via braded hose elements 106. Where a plurality of injectors are connected to one mixing chamber in the system, there may be provided a 'back-up' injector so that even if one of the injectors fails (e.g. due to blockage of one of the check valves 103*a*, 103*b* or sintered diffusers 101*a*, 101*b*), continuous (or at least less disrupted) fumigant flow into a mixing chamber is enabled. Where a plurality of injectors are connected to one mixing chamber, there are other benefits that will be apparent to the person skilled in the art, for example, if flow rate of agrochemical into the mixing chamber needs to be increased, then additional injectors may be opened to provide increased rates of flow. Therefore, this provides a benefit of counteracting an inherent restriction in flow rate that results from use of a shut-off valve (e.g. a ball valve 105*a* and 105*b* may only have an orifice which is a fraction of the diameter of the hose element 106), which itself restricts flow of the agrochemical. The sintered diffuser 101*a* can also be source of restriction of flow of the agrochemical, so increasing the number of injection points operates to counter that as well. The plurality of injectors, which may also be independently controlled, in the various combinations described herein, provide a range of potential flow rates (or a more even distribution of injected agrochemical within the mixing chamber) when one, two or more of the injection points are utilised.

Alternatively, in another embodiment (not shown) the connecting member may connect a plurality of fumigant sources, or a plurality of injectors and a plurality of fumigant sources. Where a plurality of fumigant sources are used in the system, this may provide a 'back-up' of fumigant supply to ensure continuous (or at least less disrupted) fumigant flow.

FIG. 7 is an illustration of a system for introducing a gaseous agrochemical (e.g. EDN Fumigas™) into a liquid (water), including an agrochemical source 114 and the two injectors 110*a* and 110*b* depicted in FIG. 6, plus the needle valve 104*a* and connecting member 120. The agrochemical source comprises a cylinder containing cyanogen (such as the 73 litre capacity EDN Fumigas™ cylinder), which is connected to an industrial grade nitrogen supply 115 having pressure of 8-12 bar (g). The agrochemical is propelled by the nitrogen supply 115 through the t-valve 121 and into a flow meter 117 (e.g. variable area flow meter such as ABB metal cone variety; or alternatively an oval gear flow meter, a swirl meter or a thermal mass flow meter) so that the rate of fumigant flow can be controlled. The flow meter 117 is connected to the stainless steel braided hose element 116*a* which is connected to the needle valve 104*a*, which is in turn connected to connecting member 120 and the injectors 110*a* and 110*b* by braided hose elements 116.

The agrochemical (EDN Fumigas™) evaporates if pressure inside the system drops below a pre-determined high pressure value; said pressure is dependent on the ambient temperature which influences the temperature of the system. This particular agrochemical will remain in a liquid state at a temperature of about 20 degrees at a pressure of about or above 4 bar(g), and at a temperature of about 40 degrees at a pressure of about or above 8 bar(g). The nitrogen added into the system has a role in keeping the agrochemical in the system under high pressure during application, which is important for phase regulation of the agrochemical. Vaporising of the agrochemical usually occurs between the needle valve 104*a* (which provides the first big restriction to agrochemical flow) and the sintered diffuser 101*a*, 101*b*. The most significant evaporation of the agrochemical occurs when it contacts the liquid (i.e. water) because water passes energy (particularly in the form of heat) to the agrochemical as it enters into an area with lower pressure (i.e. downstream of the check valve). The check valves 103*a*, 103*b*, are important in being located close to the inputs 111*a*, 111*b* of the injectors 110*a*, 110*b* in order to limit the likelihood of agrochemical/water interaction upstream of the check valve which may cause blockages due to polymerisation when the agrochemical (cyanogen) mixes with water. Given the modular nature of the injectors 110*a*, 110*b* they can be easily removed from the mixing chamber 102 and separated into their component parts for cleaning.

FIG. 7 includes padding valve 118 and purge valve 119. The padding valve 118 is a shut off valve which provides nitrogen from the nitrogen supply 115 into the cylinder containing the agrochemical source 114; providing a consistent supply of nitrogen to the cylinder 114 keeps a substantially constant pressure in the cylinder as the agrochemical is released from the cylinder. The purge valve 118 is a shut off valve which provides for nitrogen from the nitrogen supply 115 to enter the flow meter 117 to assist in the removal of liquid and vapour residues of the agrochemical from the connected elements.

In alternative embodiments (not shown), where there are only two injectors 110*a* and 110*b*, and no third injector, then the one of the upper or the right connection points of the connecting member 120 may be blocked by a cap; and where there is only one injector 110*a*, then both of the upper or right connection points of the connecting member 120 may be blocked by a cap.

Each of the injectors represented in the FIGS. 5 to 7 depict injectors which principally include the same components (i.e. diffuser, check valve, ball valve) and a generally similar arrangement of those components. However, several components are optional in the injector and injector system the present invention, and the arrangement of components may take a variety of forms. For example, the injector may simply comprise the sintered infuser, hex connector, body, input and output, where the body is located between the input and the output and comprises a straight section of stainless steel piping (in place of the first shut-off valve 104, check valve 103, second shut-off valve 105 and pressure gauge 108 of the injector 110 depicted in FIG. 5). The piping body of this relatively simple injector arrangement (not shown) would be connected to the hex connector (which is in turn connected to the sintered infuser), and where the input is the upper section of the piping member. Alternative embodiments of the injector and injector system are also contemplated by the disclosure in this application.

General Statements

When the term “fumigant” is used in the specification, including in the claims, it should be understood to refer, without limitation, to a fumigant or any other gaseous agrochemical.

Where the term “introduce” or “inject”, or their derivatives are used in the specification, these terms may to be considered as equivalents to the term “mix”, and its derivatives, depending on the context.

It will be appreciated by those skilled in the art that many modifications and variations may be made to the embodiments described herein without departing from the spirit and scope of the invention.

Throughout the specification and claims, the word “comprise” and its derivatives are intended to have an inclusive rather than exclusive meaning unless the contrary is expressly stated or the context requires otherwise. That is, the word “comprise” and its derivatives will be taken to indicate the inclusion of not only the listed components, steps or features, that it directly references, but also other components, steps or features not specifically listed, unless the contrary is expressly stated or the context requires otherwise.

In the present specification, terms such as “part”, “component”, “means”, “section”, “segment”, “element” or “body” may refer to singular or plural items and are terms intended to refer to a set of properties, functions or characteristics performed by one or more items having one or more parts. It is envisaged that where a “part”, “component”, “means”, “section”, “segment”, “element”, “body” or similar term is described as consisting of a single item, then a functionally equivalent object consisting of multiple items is considered to fall within the scope of the term; and similarly, where a “part”, “component”, “means”, “section”, “segment”, “element”, “body” or similar term is described as consisting of multiple items, a functionally equivalent object consisting of a single item is considered to fall within the scope of the term. The intended interpretation of such terms described in this paragraph should apply unless the contrary is expressly stated or the context requires otherwise.

The term “connected” or a similar term, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. “Connected”, or a similar term, may mean that two or more elements are either in direct physical or electrical contact, or that two or more elements are not in direct contact with each other yet still co-operate or interact with each other.

The dimensions provided in relation to the illustrative embodiments are not intended to be prescriptive of all embodiments falling within the scope of the invention. The dimensions are provided for illustrative purposes only and should not be construed otherwise.

The mere disclosure of a product or system element in the specification should not be construed as being essential to the invention claimed herein, except where it is either expressly stated to be so or expressly recited in a claim.

The terms in the claims have the broadest scope of meaning they would have been given by a person of ordinary skill in the art as of the relevant date.

The terms “a” and “an” mean “one or more”, unless expressly specified otherwise.

Neither the title nor any abstract of the present application should be taken as limiting in any way the scope of the claimed invention.

Where the preamble of a claim recites a purpose, benefit or possible use of the claimed invention, it does not limit the claimed invention to having only that purpose, benefit or possible use.

INDUSTRIAL APPLICABILITY

It is apparent from the above, that the arrangements described are applicable to numerous industries, such as horticulture, agriculture, crop science and management, in which the effective mixing an agrochemical with, and/or introducing an agrochemical into, a liquid, has commercial and practical implications.

The invention claimed is:

1. A mixer system for effectively combining gaseous agrochemical such as a fumigant and a water source for use in irrigation infrastructure, comprising:

a flow pathway adapted to interconnect a water source at a water receiving end and irrigation infrastructure at a delivery end thereof, the receiving end of the mixer system adapted to receive a flow of incoming water from the water source in a waterflow pathway;

a mixing chamber in the waterflow pathway downstream from the water receiving end, the mixing chamber having:

an inlet for receiving flow of water from the waterflow pathway;

an at least one delivery point for receiving the gaseous agrochemical into the mixing chamber to interact with the water from the water source;

an outlet for egress of the agrochemical and water mixture;

a flow restriction component at or proximal the outlet of the mixing chamber for restricting outflow of the water-agrochemical mixture at the outlet of the mixing chamber, and an agrochemical injector defining an agrochemical pathway, the ably cooperative with the at least one delivery point for injecting a gaseous injector agrochemical into the mixing chamber under pressure;

wherein the flow restriction component is adapted to generate backpressure and turbulence in the water and gaseous agrochemical combination in the mixing chamber, and thereby initiate a distribution of fine bubbles of the gaseous agrochemical in water in the mixing chamber; and wherein the distribution of fine bubbles improves mixing of the gaseous agrochemical and irrigation water and flows, effective for consistent distribution of agrochemical applied to a crop by the irrigation infrastructure, and wherein the injector includes:

an injector input for receiving the agrochemical;

a connection component for sealably securing the injector to the mixing chamber at the delivery point;

an injector output for introducing the agrochemical into the mixing chamber, the injector output including a sintered diffuser for introducing the agrochemical into the liquid flowing within the mixing chamber, wherein in operation the sintered diffuser extends sufficiently within the mixing chamber to be substantially submerged in the water as it flows in the mixing chamber, and wherein the sintered diffuser bas a media grading of about 1 μm to about 80 μm in diameter to enable production of agrochemical bubbles in the liquid having a diameter of about the same dimension; and a body through which the agrochemical can travel, the body located between the injector input and the injector output.

2. The mixer system according to claim 1, wherein the mixer includes a check valve located upstream of the mixing chamber.

3. The mixer system according to claim 1, further including an adjustable flow restriction valve downstream of the mixing chamber to substantially maintain the gaseous agrochemical exiting the mixing chamber in a distribution of bubbles in irrigation water in the waterflow pathway downstream from the mixing chamber.

4. The mixer system according to claim 3, wherein the adjustable restriction valve is selected from a shut off valve or needle valve which is adjustable to provide increased turbulence and/or entrainment of the agrochemical within the liquid, while maintaining high liquid flow rates in the mixer.

5. The mixer system according to claim 1, further including at least one static mixing section within the flow pathway downstream of the mixing chamber for dispersing or further mixing the gaseous agrochemical into the irrigation water, wherein the at least first static mixing section includes a series of baffles in a tubular housing section, the baffles providing for laminar flow division and/or turbulent flow inertia and/or radial mixing with momentum transfer.

6. The mixer system according to claim 1, wherein the injector is adapted to permit introduction of the agrochemical into the liquid at a controlled rate to ensure an effective gaseous agrochemical to water ratio.

7. The mixing system according to claim 1, wherein the agrochemical is cyanogen.

8. A method of mixing an agrochemical and a liquid for use in irrigation infrastructure including:

providing a mixer system, including a mixing chamber, as claimed in claim 1;

connecting the mixer system between a liquid supply and irrigation infrastructure;

supplying liquid from the liquid source into the mixing chamber of the mixer system in a first liquid flow;

delivering the agrochemical into the mixing chamber under pressure via at least one delivery point on the mixing chamber by the agrochemical injector in a second fluid flow pathway; and generating backpressure to the liquid flowing through the mixing chamber by a flow restriction component at or proximal the outlet of the mixing chamber, wherein the flow restriction component is adapted to generate backpressure and turbulence in the liquid and gaseous agrochemical combination in the mixing chamber, and thereby initiate a fine bubble flow distribution of the gaseous agrochemical in the liquid in the mixing chamber; and wherein the bubble flow distribution improves mixing of the gaseous agrochemical and liquid effective for consistent distribution of agrochemical throughout the irrigation infrastructure.

9. The method in accordance with claim 8, wherein the method includes the step of adjusting the flow restriction component to provide improved turbulence and/or entrainment of the agrochemical within the liquid by initiating and maintaining a large distribution of small bubbles of the gaseous agrochemical in the water flow pathway.

10. The method in accordance with claim 8, wherein the method includes monitoring the liquid flow rate using a liquid flow rate monitor and/or monitoring the agrochemical delivery rate using a delivery rate monitor locally located at the delivery point.

11. The method in accordance with claim 8, wherein the method includes the step of controlling the agrochemical delivery rate and/or adjusting the flow restriction component to provide increased homogenisation of the liquid-agrochemical mixture.

12. The method in accordance with claim 8, wherein the method includes one or more of the following steps-to provide improved turbulence and/or entrainment of agrochemical within the liquid and/or increased homogenisation of the liquid-agrochemical mixture and/or to obtain a predetermined concentration of agrochemical in the liquid-agrochemical mixture:

adjusting the flow restriction component;

controlling the agrochemical delivery rate; and/or adjusting the liquid outflow rate.

13. The method in accordance with claim 8, wherein the method includes monitoring the pressure at the mixer inlet, the mixer outlet and/or the delivery point using pressure gauges located proximate to the mixer inlet, the mixer outlet and/or the delivery point, respectively.

14. The method in accordance with claim 8, wherein the method includes adjusting the liquid mixture outflow rate and/or outlet pressure by adjusting an outlet control valve.

15. A method of soil chemigation comprising mixing an agrochemical and a liquid including:

supplying the liquid into a mixing chamber of a mixer or mixer system as claimed in claim 1, delivering the agrochemical into the mixing chamber at the delivery point;

generating backpressure to the liquid flowing through the mixing chamber to effect mixing of the liquid and the delivered agrochemical; and transferring the mixed liquid-agrochemical mixture to a distribution system either at or below ground to provide for chemical treatment of soil.

* * * * *